United States Patent
Gu et al.

(10) Patent No.: US 8,133,625 B2
(45) Date of Patent: Mar. 13, 2012

(54) POWER CONTROLLING APPARATUS FOR FUEL CELL SYSTEM AND METHOD THEREOF

(75) Inventors: Bon-Gwan Gu, Seoul (KR); Seung-Tae Ko, Seoul (KR)

(73) Assignees: LG Electronics Inc., Seoul (KR); LG Chem, Ltd., Seoul (KR)

( * ) Notice: Subject to any disclaimer, the term of this patent is extended or adjusted under 35 U.S.C. 154(b) by 1213 days.

(21) Appl. No.: 11/565,891

(22) Filed: Dec. 1, 2006

(65) Prior Publication Data

US 2007/0128483 A1  Jun. 7, 2007

(30) Foreign Application Priority Data

Dec. 6, 2005 (KR) .................... 10-2005-0118401

(51) Int. Cl.
*H01M 8/04* (2006.01)
(52) U.S. Cl. .................. 429/430; 429/444
(58) Field of Classification Search .......... 429/430, 429/444, 900, 23; 700/286
See application file for complete search history.

(56) References Cited

U.S. PATENT DOCUMENTS

| | | | |
|---|---|---|---|
| 6,175,217 B1 | 1/2001 | Da Ponte et al. | |
| 7,362,239 B2 * | 4/2008 | Franczyk et al. | 340/936 |
| 2001/0034569 A1 | 10/2001 | Yamamoto et al. | 700/295 |
| 2004/0217652 A1 | 11/2004 | Bitoh | 307/43 |
| 2005/0043860 A1 | 2/2005 | Petite | 700/291 |
| 2009/0134988 A1 * | 5/2009 | Nath et al. | 340/436 |

FOREIGN PATENT DOCUMENTS

| | | |
|---|---|---|
| EP | 1 424 760 A2 | 6/2004 |
| KR | 10-20040003348 | 1/2004 |
| KR | 100520086 | 9/2005 |
| RU | 2216847 | 11/2003 |
| RU | 2251524 | 5/2005 |
| WO | WO 02/11275 A1 | 2/2002 |
| WO | WO 2004/093288 A1 | 10/2004 |

OTHER PUBLICATIONS

U.S. Appl. No. 11/565,835 to Gu et al., filed Dec. 1, 2006.
U.S. Appl. No. 11/466,531 to Ko et al., filed Aug. 23, 2006.
U.S. Appl. No. 11/534,260 to Ko et al., filed Sep. 22, 2006.
U.S. Appl. No. 11/572,529 to Park et al., filed Jan. 23, 2007.
U.S. Appl. No. 11/572,539 to Park et al., filed Jan. 23, 2007.
U.S. Appl. No. 11/572,545 to Park et al., filed Jan. 23, 2007.
European Search Report dated Dec. 18, 2009 for Application No. 06 025 118.8.
English language Abstract of RU 2216847, Nov. 20, 2003.
English language Abstract of RU 2251524, May 10, 2005.
English language Abstract of KR 10-2005-0072329, Sep. 30, 2005.
English language Abstract of KR 10-2004-0003348, Jan. 13, 2004.

* cited by examiner

*Primary Examiner* — Cynthia H. Kelly
*Assistant Examiner* — Monique Wills
(74) *Attorney, Agent, or Firm* — Ked & Associates Inc.

(57) ABSTRACT

A power controlling apparatus for a fuel cell system includes a fuel cell controller which analyzes power state information of a fuel cell system, transmits a power state information signal based on the analysis to a power conversion controller, receives a load request power information signal from the power conversion controller, analyzes the received load request power information signal, and changes an outputtable power amount based on the analysis. The power controlling apparatus also includes a power conversion controller which transmits a load request power information signal based on power information requested by a load to the fuel cell controller, analyzes the power state information signal transmitted by the fuel cell controller, and controls a power convert amount based on the analysis.

18 Claims, 5 Drawing Sheets

POWER CONTROLLING APPARATUS FOR FUEL CELL SYSTEM AND METHOD THEREOF

RELATED APPLICATION

The present disclosure relates to subject matter contained in Korean Application No. 10-2005-0118401, filed on Dec. 6, 2005, which is expressly incorporated by reference herein in its entirety.

BACKGROUND OF THE INVENTION

1. Field of the Invention

The present invention relates to a fuel cell, and more particularly, to a power controlling apparatus for a fuel cell system capable of stably maintaining an outputtable power from a fuel cell system by performing a communication between a fuel cell controlling unit and a power conversion controlling unit, and a method thereof.

2. Description of the Background Art

Generally, a fuel cell system converts energy from a fuel cell into electric energy.

In a fuel cell, an anode and a cathode are formed at both sides of a high molecule electrolyte. An electrochemical oxidation of hydrogen, which is a fuel, is generated at the anode, and an electrochemical deoxidation of oxygen, which is an oxidizer, is generated at the cathode.

Electrons are generated by the electrochemical oxidation and the electrochemical deoxidation, and electric energy is generated as the generated electrons move in the fuel cell.

There are several types of fuel cells, such as, for example, a Phosphoric Acid Fuel Cell (PAFC), an Alkaline Fuel Cell (AFC), a Proton Exchange Membrane Cell (PEMFC), a Molten Carbonate Fuel Cell (MCFC), a Solid Oxide Fuel Cell (SOFC), and a Direct Methanol Fuel Cell (DMFC).

Applications of fuel cells include commercial fuel cells, home fuel cells, vehicle fuel cells which power electric motors, and small fuel cells which power portable terminals, notebooks, etc.

Home fuel cells are being developed which can power electric appliances, lighting systems and the like, and commercial fuel cells are being developed which can power lighting devices, motors, machines and the like which are used in a building, a factory, etc.

A fuel cell system interacts with a power supply system (such as, for example, an electric utility). When the amount of power the fuel cell system supplies to a load is deficient, the deficient amount is compensated for by the power supply system. On the contrary, when the amount of power the fuel cell system supplies to a load is in excess, the excess amount is supplied to the power supply system.

FIG. 1 is a block diagram showing a construction of a conventional power supply apparatus for a fuel cell system.

As shown, the power supply apparatus for the fuel cell system includes a fuel cell 1, a power converting unit 2, and a power supplying unit 3.

The fuel cell 1 includes a stack (not shown) which generates electricity by an electrochemical reaction between hydrogen and oxygen at a cathode and an anode. A DC voltage is generated from the stack.

The power converting unit 2 includes a DC/DC converting unit and an inverter (both not shown). The DC/DC converting unit converts the DC voltage generated by the stack into an AC voltage, boosts or lowers the converted AC voltage, and then outputs a DC voltage after rectifying the boosted or lowered AC voltage. The inverter converts a DC voltage outputted from the DC/DC converting unit (not shown) into an AC voltage.

The power supplying unit 3 supplies power to a home or other building, and may be, for example, an electric utility generation plant.

In the fuel cell system, information exchange is not performed between an entire controlling unit for performing an entire control and a power controlling unit for controlling a power output from the fuel cell. Accordingly, a power amount more than an outputtable amount from the fuel cell system is outputted by the power controlling unit, and a voltage of the fuel cell system is drastically lowered, which is called as a voltage dip phenomenon. Accordingly, stability of the fuel cell system is lowered, and a lifespan of the fuel cell system is shortened due to a large load applied to the stack.

SUMMARY OF THE INVENTION

Therefore, an object of the present invention is to provide a power controlling apparatus for a fuel cell system capable of stably maintaining an outputtable power amount from a fuel cell by preventing a voltage dip phenomenon when a power amount more than an outputtable amount is outputted from a fuel cell, and a method thereof.

To achieve these and other advantages and in accordance with the purpose of the present invention, as embodied and broadly described herein, there is provided a power controlling apparatus for a fuel cell system which includes a fuel cell controller which analyzes power state information of a fuel cell system, transmits a power state information signal to a power conversion controller in accordance with the analysis, receives a load request power information signal from the power conversion controller, and analyzes the received load request power information signal, and changes an outputtable power amount based on the analysis and a power conversion controller which transmits a load request power information signal based on power information requested by a load to the fuel cell controller, analyzes the power state information signal transmitted by the fuel cell controller, and controls a power convert amount based on the analysis.

The fuel cell controller may include a controller which calculates outputtable power state information based on an amount of hydrogen and oxygen supplied to a stack, outputs the power state information signal, which includes calculated power state information, and controls the amount of hydrogen and oxygen supplied to the stack, based on the load request power information signal, and a first wireless communicator which receives the load request power information signal, converts the power state information signal into a wireless communication signal, and transmits the converted wireless communication signal to the power conversion controller.

The first wireless communicator may include an RF signal generator which converts the power state information signal into an RF power state information signal, and transmits the converted RF power state information signal to the power conversion controller. The first wireless communicator may communicate using a wireless LAN protocol or a Bluetooth protocol. The power state information signal may include an error check code for detecting a communication error. The load request power information signal may include an error check code for detecting a communication error.

The fuel cell controller may include a controller which calculates outputtable power state information based on an amount of hydrogen and oxygen supplied to a stack, outputs the power state information signal, which includes calculated power state information, and controls the amount of hydrogen and oxygen supplied to the stack based on the load request power information signal, and a first wire communicator which receives the load request power information signal, converts the power state information signal into a wire communication signal, and transmits the converted wire communication signal to the power conversion controller through a wire cable. The first wire communicator may communicate using a USB protocol.

The power conversion controller may include a wireless communicator which receives the power state information signal, and a controller which generates a control signal to control a power amount outputted from the fuel cell based on the power state information signal, analyzes power information requested by a load, and outputs the load request power information signal based on the analysis. The wireless communicator may convert the load request power information signal into a wireless communication signal, and transmit the converted wireless communication signal to the fuel cell controller. The wireless communicator may communicate using RF signals. The wireless communicator may communicate using a wireless LAN protocol or a Bluetooth protocol.

The power conversion controller may include a wire communicator which receives the power state information signal, and a controller which generates a control signal to control a power amount outputted from the fuel cell based on the power state information signal, analyzes power information requested by a load, and outputs the load request power information signal based on the analysis. The wire communicator may convert the load request power information signal into a wire communication signal, and transmit the converted wire communication signal to the fuel cell controller through a wire cable. The wire communicator may communicate using a USB protocol.

There is also provided a power controlling method for a fuel cell system which includes generating a power state information signal based on power state information of a fuel cell system, transmitting the generated power state information signal, extracting outputtable power information from the power state information signal, and controlling a power convert amount based on the extracted outputtable power information.

The method may also include extracting an error check code from the power state information signal, and determining whether a transmission error exists based on the extracted error check code. Transmitting the generated power state information signal may include converting the power state information signal into a wireless communication signal and wirelessly transmitting it to a power conversion controller. Transmitting the generated power state information signal may include converting the power state information signal into a wire communication signal and transmitting it to a power conversion controller through a wire cable.

There is also provided a power controlling method for a fuel cell system which includes generating a load request power information signal based on power information requested by a load, transmitting the load request power information signal, extracting load request power information from the load request power information signal, and controlling a fuel amount and an air amount applied to a fuel cell based on the extracted load request power information signal, thus changing an outputtable power amount of the fuel cell.

The method may also include extracting an error check code from the load request power information signal, and determining whether a transmission error exists based on the extracted error check code. Transmitting the load request power information signal may include converting the load request power information signal into a wireless communication signal and wirelessly transmitting it to a fuel cell controller. Transmitting the load request power information signal may include converting the load request power information signal into a wire communication signal and transmitting it to a fuel cell controller through a wire cable.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will be made in detail to preferred embodiments of the present invention, examples of which are illustrated in the accompanying drawings.

Hereinafter, a power controlling apparatus for a fuel cell system is described which is capable of stably maintaining an outputtable power amount from a fuel cell through communication between a fuel cell controlling unit and a power conversion controlling unit.

Figure 1:
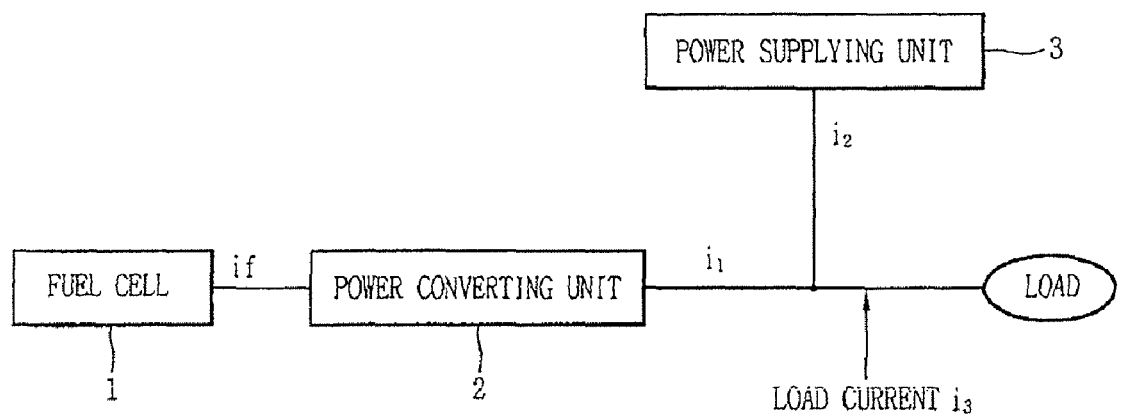
FIG. 1 is a block diagram showing a conventional fuel cell system.
Figure 2:
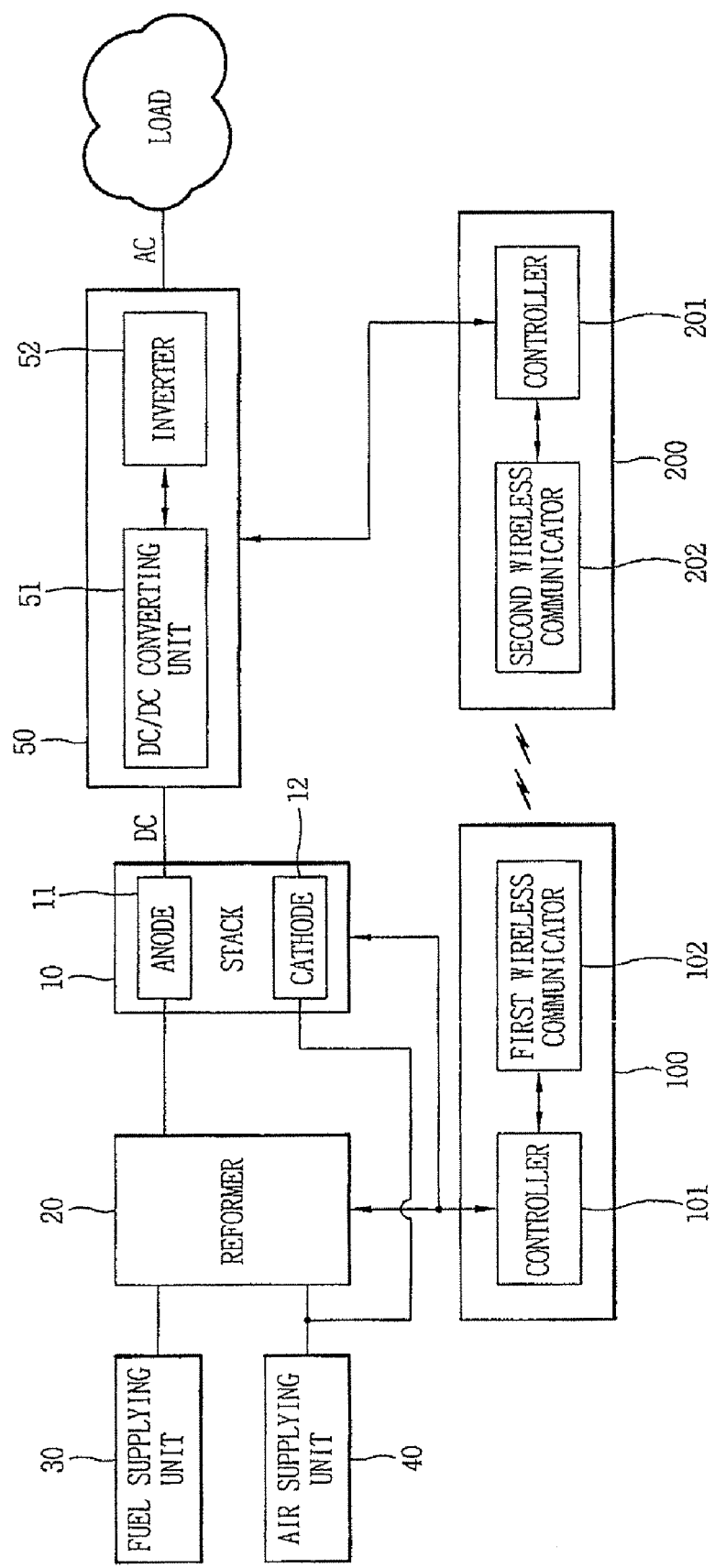
FIG. 2 is a block diagram showing a construction of a power controlling apparatus for a fuel cell system according to one embodiment of the present invention.

FIG. 2 is a block diagram showing a construction of a power controlling apparatus for a fuel cell system according to one embodiment of the present invention.

As shown in FIG. 2, the power controlling apparatus for a fuel cell system according to one embodiment of the present invention includes a reformer 20, a stack 10, a power converting unit 50, a fuel cell controlling unit 100, and a power conversion controlling unit 200.

The reformer 20 extracts hydrogen from fuel, and applies the extracted hydrogen to the stack 10.

The stack 10 is provided with an anode 11 and a cathode 12, and generates electric energy (a DC voltage) and a byproduct by an electrochemical reaction between hydrogen supplied to the anode 11 and oxygen supplied to the cathode 12.

The power converting unit 50 converts a DC voltage outputted from the stack 10 into an AC voltage of a certain level based on a control signal, and outputs the converted AC voltage. The power converting unit 50 includes a DC/DC converting unit 51 which converts a DC voltage outputted from the stack 10 of the fuel cell into a DC voltage which is boosted or lowered, and outputs the converted DC voltage, and an inverter 52 which converts a DC voltage outputted from the DC/DC converting unit 51 into an AC voltage based on a control signal from the power conversion controlling unit 200.

The fuel cell controlling unit 100 analyzes power state information of the fuel cell system, generates a power state information signal based on the analysis, and transmits the generated power state information signal to the power conversion controlling unit 200.

The fuel cell controlling unit 100 receives a load request power information signal from the power conversion controlling unit 200, analyzes the received load request power information signal, and changes an outputtable power amount of the fuel cell system based on the analysis.

The fuel cell controlling unit 100 includes a controller 101 which calculates outputtable power state information based on an amount of hydrogen and oxygen supplied to the stack 10, outputs a power state information signal which includes the calculated power information, and controls the amount of hydrogen and oxygen supplied to the stack 10; and a first wireless communicator 102 which receives the load request power information signal, converts the power state information signal of the controller 101 into a wireless communication signal, and transmits the converted wireless communication signal to the power conversion controlling unit 200.

The power conversion controlling unit 200 includes a controller 201 which generates a control signal to control a power amount outputted from the fuel cell based on the power state information signal, analyzes power information requested by a load, and outputs a load request power information signal based on the analysis; and a second wireless communicator 202 which receives the power state information signal, converts the load request power information signal into a wireless communication signal, and transmits the converted wireless communication signal to the fuel cell controlling unit 100.

Figure 4:
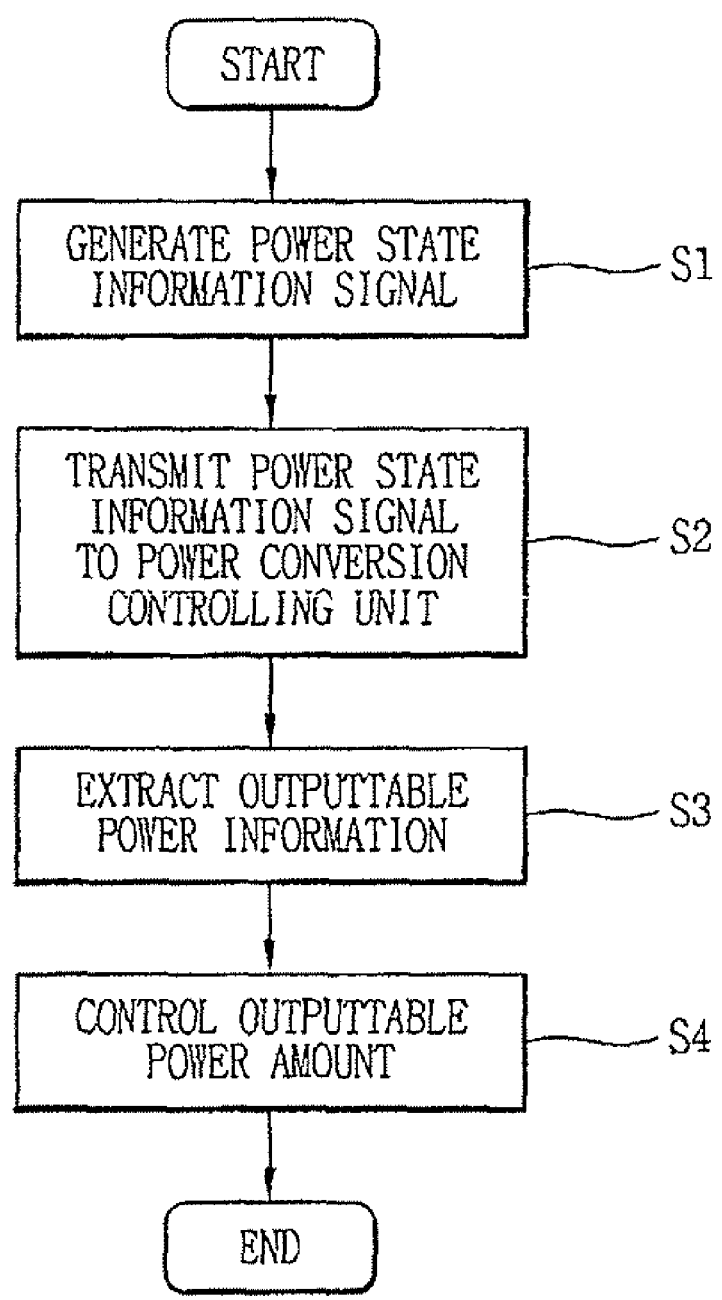
FIG. 4 is a flowchart showing a power controlling method for a fuel cell system according to an embodiment of the present invention.
Figure 5:
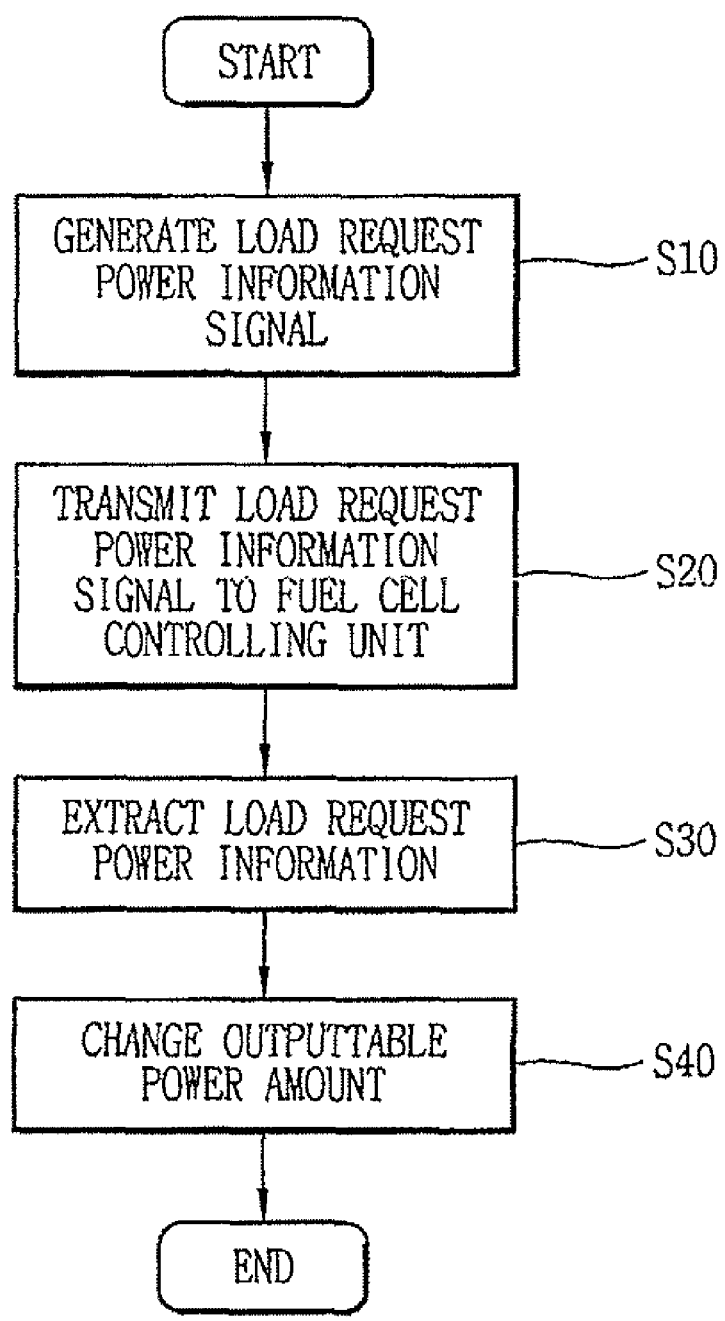
FIG. 5 is a flowchart showing a method of changing an outputtable power amount in a fuel cell according to an embodiment of the present invention.

An operation of the power controlling apparatus for a fuel cell system will be explained with reference to FIGS. 4 and 5.

The controller 101 of the fuel cell controlling unit 100 calculates outputtable power state information based on an amount of hydrogen and oxygen supplied to the stack 10, generates a power state information signal including the calculated power information, and applies the generated power state information signal to the first wireless communicator 102 (S1).

Then, the first wireless communicator 102 converts the power state information signal into a wireless communication signal, and transmits the converted wireless communication signal to the power conversion controlling unit 200 (S2).

The first wireless communicator 102 may be implemented a variety of ways. For example, the wireless communicator 102 may be a transceiver which communicates via for example, but not limited to, Bluetooth, a wireless LAN protocol, or other types of RF signals. Thus, the first wireless communicator 102 may include an RF signal generator which converts the power state information signal into an RF power state information signal, and transmits the converted RF power state information signal to the power conversion controller.

The second wireless communicator 202 of the power conversion controlling unit 200 receives the wireless communication signal transmitted from the first wireless communicator 102, converts the received wireless communication signal into the power state information signal, and supplies it to the controller 201.

The second wireless communicator 202 is a device which is capable of communicating with the first wireless communicator 102. For example, if the first wireless communicator 102 communicates via Bluetooth, the second communicator 202 also communicates via Bluetooth. Thus, the second wireless communicator 202 may also be implemented a variety of ways. For example, the wireless communicator 102 may be a transceiver which communicates via Bluetooth, via a wireless LAN protocol, or via other types of RF signals. Of course, other types of wireless signals may be utilized without departing from the scope or spirit of the invention.

The controller 201 extracts outputtable power information from the power state information signal, and supplies a control signal to control a power amount outputted from the stack 10 of the fuel cell based on the extracted outputtable power information to the power converting unit 50 (S3).

That is, the controller 202 of the power conversion controlling unit 200 controls a boost of the DC/DC converting unit 51 of the power converting unit 50, or controls a switching period of the inverter 52, thereby controlling a power amount outputted from the stack 10 of the fuel cell (S4).

The power state information signal may include an error check code for detecting a communication error, and the controller of the power conversion controlling unit 200 may detect a transmission error of the power state information signal based on the error check code.

A process for changing the outputtable power amount from the fuel cell is explained below.

The controller of the power conversion controlling unit 200 analyses power information requested by a load, generates a load request power information signal based on the analysis, and supplies the generated load request power information signal to the second wireless communicator 202 (S10).

The second wireless communicator 202 converts the load request power information signal into a wireless communication signal, and transmits the converted wireless communication signal to the fuel cell controlling unit 100 (S20).

The first wireless communicator 102 of the fuel cell controlling unit 200 receives the wireless communication signal transmitted from the second wireless communicator 202, converts the received wireless communication signal into the load request power information signal, and supplies it to the controller 101.

The controller 101 extracts load request power information from the load request power information signal, and controls an amount of hydrogen and oxygen supplied to the stack 10 based on the extracted load request power information, thereby changing an outputtable power amount from the fuel cell (S40).

The load request power information signal may include an error check code for detecting a communication error, and the controller 101 of the fuel cell controlling unit 100 may detect a transmission error of the load request power information signal based on the error check code.

Figure 3:
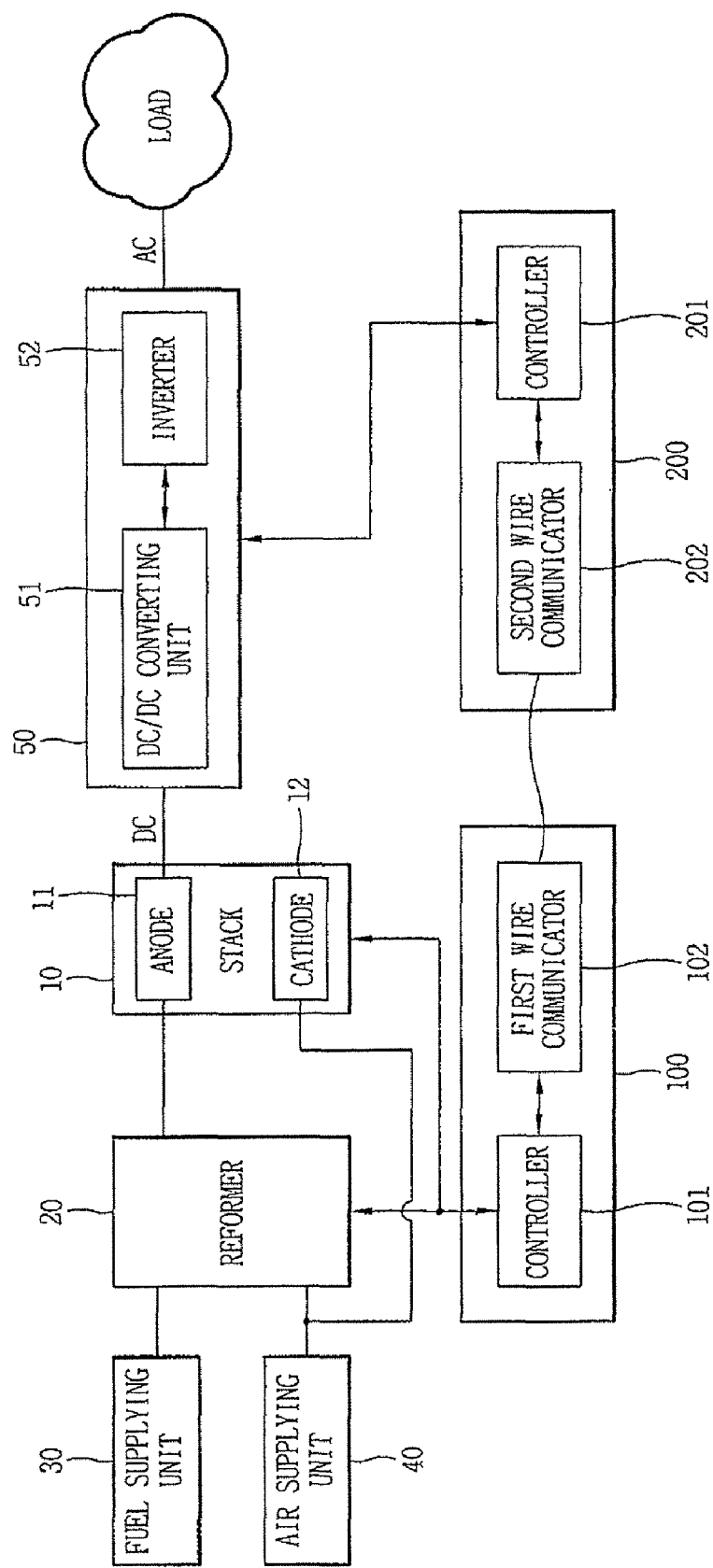
FIG. 3 is a block diagram showing a construction of a power controlling apparatus for a fuel cell system according to another embodiment of the present invention.

FIG. 3 is a block diagram showing a construction of a power controlling apparatus for a fuel cell system according to another embodiment of the present invention.

As shown in FIG. 3, the power controlling apparatus for a fuel cell system according to another embodiment of the present invention includes a reformer 20, a stack 10, a power converting unit 50, a fuel cell controlling unit 100, and a power conversion controlling unit 200.

The reformer 20 extracts hydrogen from fuel, and applies the extracted hydrogen to the stack 10.

The stack 10 is provided with an anode 11 and a cathode 12, and generates electric energy (a DC voltage) and a byproduct by an electrochemical reaction between hydrogen supplied to the anode 11 and oxygen supplied to the cathode 12.

The power converting unit 50 converts a DC voltage outputted from the stack 10 into an AC voltage of a certain level based on a control signal, and outputs the AC voltage. The power converting unit 50 includes a DC/DC converting unit 51 which converts a DC voltage outputted from the stack 10 of the fuel cell into a boosted or lowered DC voltage, and an inverter 52 which converts a DC voltage outputted from the DC/DC converting unit 51 into an AC voltage based on a control signal of the power conversion controlling unit 200.

The fuel cell controlling unit 100 analyzes power state information of the fuel cell system, generates a power state information signal based on the analysis, and transmits the generated power state information signal to the power conversion controlling unit 200.

The fuel cell controlling unit 100 receives a load request power information signal from the power conversion controlling unit 200, analyzes the received load request power information signal, and changes an outputtable power amount based on the analysis.

The fuel cell controlling unit 100 includes a controller 101 which calculates outputtable power state information based on an amount of hydrogen and oxygen supplied to the stack 10, outputs a power state information signal including the calculated power information, and controls the amount of hydrogen and oxygen supplied to the stack 10. The fuel cell controlling 100 also includes a first wire communicator 103 which receives the load request power information signal, converts the power state information signal of the controller 101 into a wire communication signal, and transmits the converted wire communication signal to the power conversion controlling unit 200 through a wire cable.

The power conversion controlling unit 200 includes a controller 201 which generates a control signal to control a power amount outputted from the fuel cell based on the power state information signal, analyzes power information requested by a present load, and outputs a load request power information signal based on the analysis. The power conversion controlling unit 200 additionally includes a second wire communicator 203 which receives the power state information signal, converts the load request power information signal into a wire communication signal, and transmits the converted wire communication signal to the fuel cell controlling unit 100.

An operation of the power controlling apparatus for a fuel cell system will be explained with reference to FIGS. 4 and 5.

The controller 101 of the fuel cell controlling unit 100 calculates an outputtable power state information based on an amount of hydrogen and oxygen supplied to the stack 10, generates a power state information signal including the calculated power state information, and applies the generated power state information signal to the first wire communicator 103 (S1).

The first wire communicator 103 converts the power state information signal into a wire communication signal, and transmits the converted wire communication signal to the second wire communicator 203 (S2).

The first wire communicator 103 may be implemented in a variety of ways. For example, the first wire communicator 103 may communicate via Universal Serial Bus (USB) protocol, Ethernet protocol, 1394, or other cable or wire-based protocol without departing from the spirit or scope of the invention.

The second wire communicator 203 of the power conversion controlling unit 200 receives a wire communication signal transmitted from the first wire communicator 103, converts the received wire communication signal into the power state information signal, and supplies it to the controller 201.

The second wire communicator 203 is a device corresponding to the first wire communicator 103, and may also be implemented in a variety of ways, such as, but not limited to, for example, a USB transceiver or Ethernet transceiver.

The controller 201 extracts outputtable power information from the power state information signal (S3), and supplies a control signal to control a power amount outputted from the stack 10 of the fuel cell, based on the extracted outputtable power information to the power converting unit 50 (S4).

The controller 202 of the power conversion controlling unit 200 controls a boost of the DC/DC converting unit 51 of the power converting unit 50, or controls a switching period of the inverter 52, thereby controlling a power amount outputted from the stack 10 of the fuel cell (S4).

The power state information signal may include an error check code for detecting a communication error, and the controller of the power conversion controlling unit 200 may detect a transmission error of the power state information signal based on the error check code.

A process for changing the outputtable power amount from the fuel cell is explained below.

The controller of the power conversion controlling unit 200 analyses power information requested by a load, generates a load request power information signal based on the analysis, and supplies it to the second wire communicator 203 (S10).

Then, the second wire communicator 203 converts the load request power information signal into a wire communication signal, and transmits the converted wire communication signal to the fuel cell controlling unit 100 (S20).

The first wire communicator 103 of the fuel cell controlling unit 200 receives a wire communication signal transmitted from the second wire communicator 203, converts the received wire communication signal into the load request power information signal, and supplies it to the controller 101.

Then, the controller 101 extracts load request power information from the load request power information signal (S30), and controls an amount of hydrogen and oxygen supplied to the stack 10, based on the extracted load request power information, thereby changing an outputtable power amount from the fuel cell (S40).

The load request power information signal may include an error check code for detecting a communication error, and the controller 101 of the fuel cell controlling unit 100 may detect a transmission error of the load request power information signal based on the error check code.

In the present invention, outputtable power information calculated by the fuel cell controlling unit is transmitted to the power conversion controlling unit, thereby preventing a voltage dip phenomenon when a power amount higher than an outputtable power amount is outputted from the fuel cell. Accordingly, an outputtable power amount from the fuel cell can be stably maintained.

Furthermore, an outputtable power amount from the fuel cell system can be changed by transmitting load request power information to the fuel cell controlling unit from the power conversion controlling unit. Accordingly, the power controlling apparatus for a fuel cell system of the present invention can stably correspond to a load.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A power controlling apparatus for a fuel cell system, comprising:
   a fuel cell controller which:
   analyzes power state information of a fuel cell system and transmits a power state information signal in accordance with the analysis, the power state information indicative of an amount of power of the fuel cell system, and
   receives a load request power information signal, analyzes the received load request power information signal, and generates a first control signal to change an amount of power to be output from the fuel cell system based on the analysis of the received load request power information signal; and
   a power conversion controller which is configured to:
   transmit the load request power information signal to the fuel cell controller based on power information requested by a load, and
   analyze the power state information signal transmitted by the fuel cell controller, and generates a second control signal to control a power conversion amount based on the analysis of the power state information signal.

2. The apparatus according to claim 1, wherein the fuel cell controller comprises:
   a controller which calculates outputtable power state information based on an amount of hydrogen and oxygen supplied to a stack, outputs the power state information signal, which includes calculated power state information, and generates the first control signal to control the amount of hydrogen and oxygen to be supplied to the stack, based on the load request power info nation signal; and
   a first wireless communicator which receives the load request power information signal, converts the power state information signal into a wireless communication signal, and transmits the converted wireless communication signal to the power conversion controller.

3. The apparatus according to claim 2, wherein the first wireless communicator comprises an RF signal generator which converts the power state information signal into an RF power state information signal, and transmits the converted RF power state information signal to the power conversion controller.

4. The apparatus according to claim 2, wherein the first wireless communicator communicates using a wireless LAN protocol.

5. The apparatus according to claim 2, wherein the first wireless communicator communicates using a wireless protocol.

6. The apparatus according to claim 1, wherein the power state information signal includes an error check code for detecting a communication error.

7. The apparatus according to claim 1, wherein the load request power information signal includes an error check code for detecting a communication error.

8. The apparatus according to claim 1, wherein the fuel cell controller comprises:
   a controller which calculates an outputtable power state information based on an amount of hydrogen and oxygen supplied to a stack, outputs the power state information signal, which includes calculated power state information, and generates the first control signal to control the amount of hydrogen and oxygen supplied to the stack based on the load request power information signal; and
   a first wire communicator which receives the load request power information signal, converts the power state information signal into a wire communication signal, and transmits the converted wire communication signal to the power conversion controller through a wire cable.

9. The apparatus according to claim 8, wherein the first wire communicator communicates using a USB protocol.

10. The apparatus according to claim 1, wherein the power conversion controller comprises:
    a wireless communicator which receives the power state information signal; and
    a controller which generates the second control signal to control a power amount outputted from the fuel cell based on the power state information signal, analyzes power information requested by a load, and outputs the load request power information signal based on the analysis,
    wherein the wireless communicator converts the load request power information signal into a wireless communication signal, and transmits the converted wireless communication signal to the fuel cell controller.

11. The apparatus according to claim 10, wherein the wireless communicator communicates RF signals.

12. The apparatus according to claim 10, wherein the wireless communicator communicates using a wireless LAN protocol.

13. The apparatus according to claim 10, wherein the wireless communicator communicates using a wireless protocol.

14. The apparatus according to claim 1, wherein the power conversion controller comprises:
    a wire communicator which receives the power state information signal; and
    a controller which generates a control signal to control a power amount outputted from the fuel cell based on the power state information signal, analyzes power information requested by a load, and outputs the load request power information signal based on the analysis,
    wherein the wire communicator converts the load request power information signal into a wire communication signal, and transmits the converted wire communication signal to the fuel cell controller through a wire cable.

15. The apparatus according to claim 14, wherein the wire communicator communicates using a USB protocol.

16. The apparatus according to claim 1, further comprising:
    a converter to receive power output from the fuel cell system, to convert the received power based on the second control signal, and to output the converted power for receipt by the load, wherein the power received by the converter from the fuel cell system remains substantially unchanged during the conversion.

17. The system of claim 1, wherein the first signal path is a wireless signal path.

18. The system of claim 13, wherein the wireless protocol is a Bluetooth protocol.

* * * * *